(12) United States Patent
Broumand

(10) Patent No.: US 8,065,186 B2
(45) Date of Patent: Nov. 22, 2011

(54) METHOD FOR OPTING INTO ONLINE PROMOTIONS

(75) Inventor: Joseph Broumand, New York, NY (US)

(73) Assignee: Opt-Intelligence, Inc., New York, NY (US)

( * ) Notice: Subject to any disclaimer, the term of this patent is extended or adjusted under 35 U.S.C. 154(b) by 0 days.

(21) Appl. No.: 12/773,384

(22) Filed: May 4, 2010

(65) Prior Publication Data

US 2010/0223130 A1    Sep. 2, 2010

Related U.S. Application Data

(63) Continuation of application No. 10/761,987, filed on Jan. 21, 2004, now abandoned.

(51) Int. Cl.
*G06Q 30/00* (2006.01)
(52) U.S. Cl. .............. 705/14.69; 705/14.4; 705/14.49; 705/14.73
(58) Field of Classification Search ......... 726/7; 705/14
See application file for complete search history.

(56) References Cited

U.S. PATENT DOCUMENTS

| | | | |
|---|---|---|---|
| 6,282,658 B2 * | 8/2001 | French et al. ............ | 726/7 |
| 2002/0046099 A1 * | 4/2002 | Frengut et al. ............ | 705/14 |

* cited by examiner

*Primary Examiner* — Yehdega Retta
*Assistant Examiner* — Afaf Ahmed
(74) *Attorney, Agent, or Firm* — Bockhop & Associates, LLC

(57) ABSTRACT

In a system and method for flexibly offering on-line promotions to visitors of a website hosted by a server, when a user signs up with the website, the server collects a plurality of user data from the visitor. If a user's data matches predetermined criteria from an advertiser, then on-line promotions from this advertiser are included in an opt-in window displayed to the user. The server dynamically generates pricing information for each advertiser according to a flexible algorithm. The flexible algorithm depends on the type and quality of user requested by the advertiser.

11 Claims, 9 Drawing Sheets

200

202 204

| First Name | James |
| --- | --- |
| Last Name | Stevens |
| Email address | james@hotmail.com |
| Address 1 | 25 Main Street |
| Address 2 | Apt. 6 |
| City | New York |
| State | NY |
| Zip code | 10023 |
| Country | US |
| Gender | M |
| Date of birth | 01/16/1968 |
| Phone number | 212-555-3333 |
| IP address | 111.231.441.19 |

| Advtzr | email | City | State | ZIP | Country | Sex | Age | Phone | |
| --- | --- | --- | --- | --- | --- | --- | --- | --- | --- |
| Ad_1 | valid | | GA | | US | M | | | 302 |
| Ad_2 | | | | 30309 | | F | 20-30 | | 304 |
| Ad_3 | valid | | | | US | M | 25-35 | | 306 |
| Ad_3 | | | GA | | | | | 404 | 308 |

FIG. 3

| | 810 | 812 | 814 ← 800 |
|---|---|---|---|
| 802 | Adv_1 | Promo_1 | Record of Recipients |
| 804 | Adv_1 | Promo_2 | Record of Recipients |
| 806 | Adv_2 | Promo_1 | Record of Recipients |
| 808 | Adv_3 | Promo_1 | Record of Recipients |

FIG. 7

METHOD FOR OPTING INTO ONLINE PROMOTIONS

CROSS-REFERENCE TO RELATED APPLICATION(S)

This application is a continuation of, and claims the benefit of, U.S. patent application Ser. No. 10/761,987, filed Jan. 21, 2004, the entirety of which is hereby incorporated herein by reference.

BACKGROUND OF THE INVENTION

1. Field of the Invention

The present invention relates to on-line advertising and, more specifically, to targeted on-line promotions offered through a computer network.

2. Description of the Related Art

As technology advances and computers become a staple item in every household, the volume of the e-commerce increases significantly. More merchants are moving their businesses to Internet based e-commerce. Consequently, the competition for consumers' attention has become fierce on the Internet and consumers are flooded with advertisements and not-so-welcome pop-up windows that have nothing but advertisements.

The return of these advertisements is generally low, because it is difficult for a merchant to direct an ad to a specific group of consumers. Often the ad is displayed to all consumers who visit a particular website, and these consumers may or may not fit the demographic group in which the merchant is interested. A similar situation happens with an opt-in window with a list of products, where a consumer can select a product about which he would like to receive more information. Generally, an opt-in window with a list of similar products are shown to every consumer who visits a website, whether or not the consumer belongs to a group to which the merchant of a product is targeting.

Besides the advertisements having a low return, merchants are charged at a flat fee that may be dependent on the popularity of a particular website. The fee does not reflect the quality of user data the website collects.

Therefore, there is a need for an option in the advertising system that targets consumers selectively and that charges advertisers based on a measure of success.

SUMMARY OF THE INVENTION

The invention is a system and method that present a customized opt-in window, with selected ads, to a user. In one aspect, an ad promoter receives target information from an advertiser setting forth a set of criteria used to select a user from a plurality of users to receive selected on-line promotions. A web host, under contract with the ad promoter, displays a web page to the plurality of users, and the web page has a plurality of fields for collecting user information. After the users enter user information, the ad promoter receives the user information from each of the plurality of the users and compares the user information from each of the plurality of the users to the set of criteria set forth by the advertiser. For each of the plurality of the users whose user information matches the set of criteria, the ad promoter displayer an on-line promotion from the advertiser in an opt-in window.

Before comparing the user information to the set of criteria from the advertiser, the ad promoter ensures that the user information is valid by checking it against a plurality of sources. If the user information is not valid, the ad promoter asks the user to re-enter the information. The ad promoter will forward the user information that has been validated to the advertiser if the user has opted to receive additional information from the advertiser.

In another aspect, the invention is a method for billing an advertiser for on-line promotions. A web page is displayed to a user. The web page has a plurality of fields for collecting user information. The user information is received from the user. An on-line promotion from an advertiser based on the user information is selected. The selected on-line promotion is displayed to the user. The advertiser is billed in an amount based on at least one objective factor indicative of a success level of the on-line promotion.

In yet another aspect, the invention is a method for billing an advertiser for on-line promotions. A web page to a plurality of users, and the web has a plurality of fields for collecting user information. The user information is received from each of the plurality of users and compared to a set of criteria defined by an advertiser. For each of the plurality of users whose user information matches the set of criteria defined by the advertiser, an on-line promotion from the advertiser is displayed. Besides displaying the, the user information is provided to the advertiser and the advertiser is billed based on at least one objective factor indicative of a success level of the on-line promotion.

In yet another aspect, the invention is a method for presenting customized on-line promotions in an opt-in window. A target information is received from an advertiser setting forth a set of criteria used to select a user from a plurality of users to receive a selected on-line promotion. A web page is displayed to the plurality of users, wherein the web page has a plurality of fields for collecting user information. The user information is received from each of the plurality of users and compared to the set of criteria. For each of the plurality of users whose user information matches the set of criteria, an on-line promotion from the advertiser is displayed in an opt-in window, and the user information is provided to the advertiser. The advertiser is billed for an amount based on the type of user information provided to the advertiser and at least one objective factor indicative of a success level of the on-line promotion.

In yet another aspect, the invention is system for presenting a customized opt-in window to a user. The system has a server connected to a global computer network, and the server includes a network interface in communication with the global computer network. The server also has a controller configured for communicating with the user on the global computer network, a user data validation unit configured for validation the information received from the user including information indicating that the use has opted into at least one on-line promotion, an electronic mail handler configured for sending an confirmation e-mail to a user who has opted in to at least one on-line promotion, a pricing calculator configured for generating pricing information to advertisers whose on-line promotions have been selected by at least one user, and a data storage unit configured for storing the set of advertiser criteria. The controller also selects on-line promotions, according to a set of advertiser criteria, for display in the customized opt-in window communicated to the user. The pricing calculator is configured for generating the pricing information according to at least one objective factor indicative of a success level of the on-line promotions.

In yet another aspect, the invention is a computer-readable medium on which is stored a computer program for presenting a customized opt-in window. The computer program includes instructions which, when executed by a computer, perform the steps of receiving target information from an advertiser, displaying a web page to the plurality of users, receiving user information from each of the plurality of the users, and comparing the user information from each of the plurality of the users to the set of criteria. For each of the plurality of the users whose user information matches the set of criteria, the computer program displays an on-line promotion from the advertiser in an opt-in window. The web page has a plurality of fields for collecting user information. The target information sets forth a set of criteria used to select a user from a plurality of users to receive a selected on-line promotion.

Other advantages and features of the present invention will become apparent after review of the hereinafter set forth Brief Description of the Drawings, Detailed Description of the Invention, and the Claims.

BRIEF DESCRIPTION OF THE FIGURES OF THE DRAWINGS

FIG. 2 is a collection of user information according to one embodiment of the invention.

FIG. 3 is a set of advertiser criteria.

FIG. 7 depicts a plurality of promotional records.

DETAILED DESCRIPTION OF THE INVENTION

In this description, the terms "advertiser" and "merchants" are used interchangeably, the terms "user" and "consumer" are used interchangeably, and "Global Computer network" includes the Internet. Like numerals refer to like elements throughout the several views. The articles "a" and "the" includes plural references, unless otherwise specified in the description. Although elements of the invention may be described or claimed in the singular, the plural is contemplated unless limitation to the singular is explicitly stated. "Ad" includes advertisement.

The invention provides a way for an ad promoter to provide on-line promotions to selected users through a web host, wherein the users are selected through criteria defined by advertisers whose products are listed in the on-line promotions. Though described as independent entities, the ad promoter and the web host may be a single entity exercising roles herein described for the ad promoter and web host. The on-line promotions include on-line offers of products or services, on-line advertisements, and any other type of promotional ad campaign conducted through a network. The web host collects information from the users who visit a website. The information collected is forwarded to an ad promoter who validates the information and compares it with the criteria defined by the advertisers. If the information from a user matches the criteria defined by an advertiser, the ad promoter selects the on-line promotion from the advertiser to be shown to the user in an opt-in window. If the user opts into with the promotion, the ad promoter collects the user data and sends a confirmation e-mail on behalf of the advertiser to the user. The ad promoter bills the advertiser based on the success rate of the on-line promotions. The ad promoter may also bill the advertiser based on the type of data requested by the advertiser.

Figure 1A:
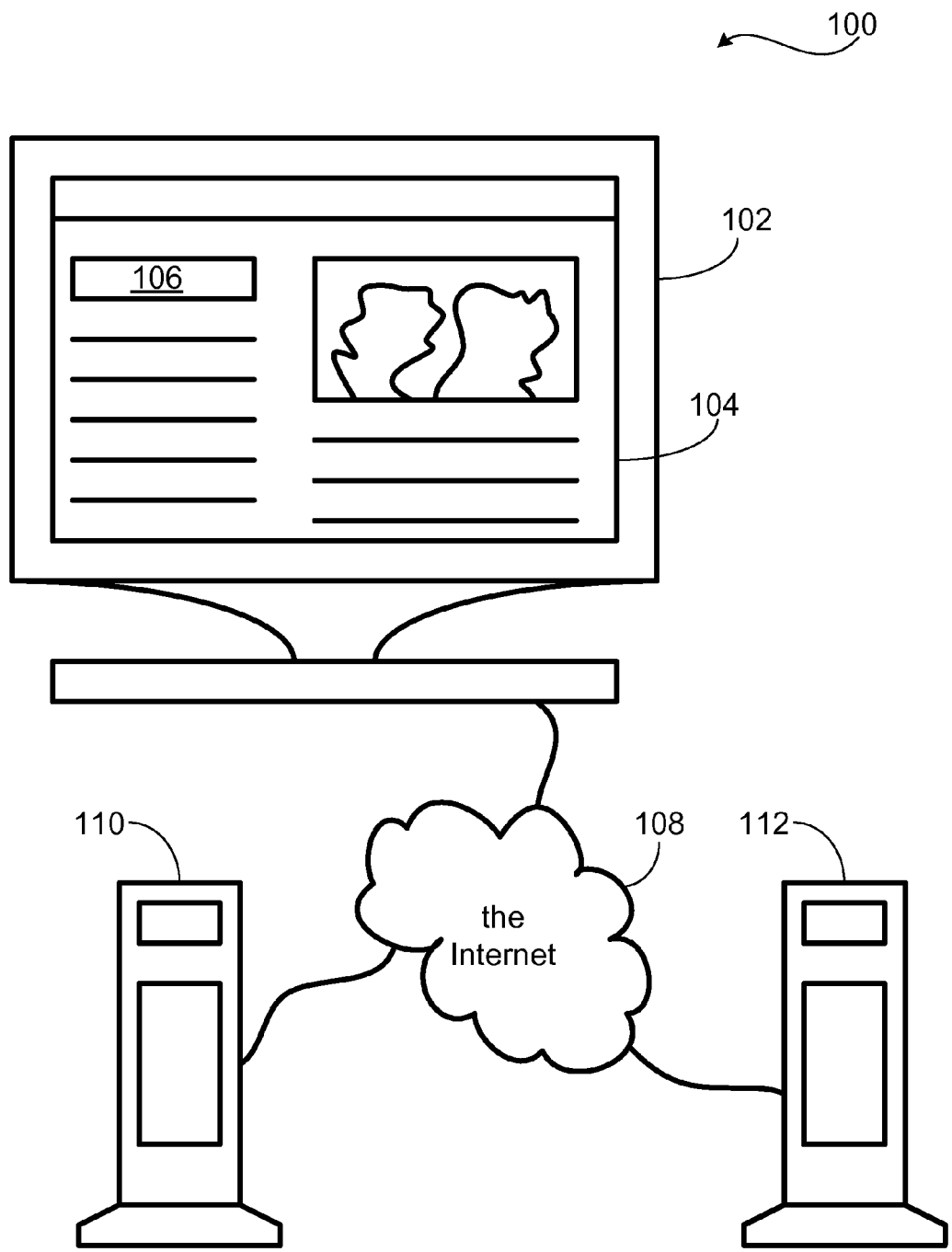
FIG. 1A is a schematic drawing of an information delivery system according to the invention.

FIG. 1A illustrates an architecture of a system 100 that supports one embodiment of the invention. A user uses a computing device with a monitor 102 to access the Internet 108 and to engage in e-commerce. The user visits a website hosted by a web server 110 by entering the website's domain name or its Internet Protocol (IP) address. The web server 110 belongs to a web host and communicates with a promoter server 112 that belongs to an on-line ad promoter. Alternatively, the web server 110 and the promoter server 112 may be combined into one single server. After the user enters the website address, the web server 110 sends a web page to the user's computer, and the web page 104 is displayed on the user's monitor 102. The web page 104 may present a variety of information and services to the user, and the web page may also invite the user to register with the website host through a registration button 106. For example, if the user visits a sports website, the sports website may invite the user to register with the sports website so that the user can receive the latest sport scores through electronic mail (e-mail) messages. If the user accepts the invitation from the website, the website will display a registration screen to the user. The registration screen lists a plurality of data fields where the user can enter personal information.

Figure 1B:
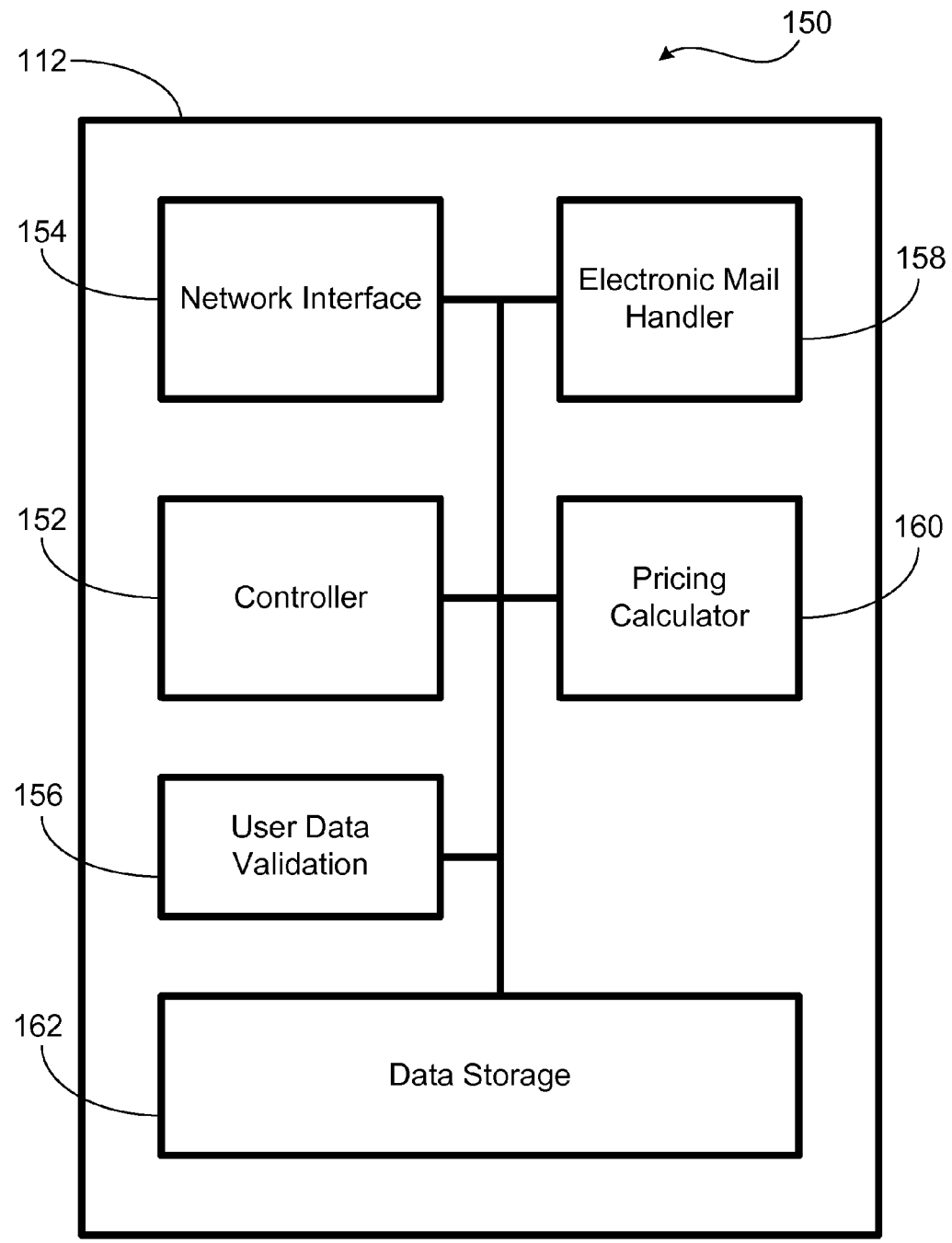
FIG. 1B is a schematic drawing of an architecture of a server according to the invention.

After entering the information, the computing device sends the information to the web server 110, which forwards it to the promoter server 112. FIG. 1B illustrates an architecture 150 of a promoter server 112 supporting the present invention. The promoter server 112, in the form of software or dedicated hardware or a combination thereof, includes a controller 152, a network interface unit 154, a user data validation unit 156, an electronic mail handler 158, a pricing calculator 160, and a data storage unit 162. The promoter server 112 receives the user information from the web server 110 through the network interface unit 154. The controller 152 receives the user information, and sends it to the user data validation unit 156 for validation and formatting. If the information is valid, the controller 152 compares it with a set of criteria provided by a plurality of advertisers. If the information is not valid, the controller 152 may request the user to re-enter the information. An example of an invalid user information may a user information with an incorrect ZIP code or an incomplete age field. After comparing the data with the set of criteria, the controller 152 selects from the data storage 162 on-line promotions from those advertisers whose criteria are met by the user information and then displays selected on-line promotions in an opt-in window to the user. The opt-in window may have many different presentations. It may be a window covering the entire display area on a computer screen; it may cover a partial area on the computer screen. It may also be a banner across top or bottom of the computer screen. The opt-in window may list several products with each product being associated with a corresponding check box for the user to indicate a desire for more information about a product.

If the user opts to receive additional information from the selected advertisers, the controller 152 forwards the user information to the selected advertisers and the electronic mail handler 158 sends a confirmation e-mail to the user. The pricing calculator 160 calculates a fee to be billed to the advertisers for the on-line promotions and for the user information.

FIG. 2 is a list of typical user data 200 that may be collected from the user. The list may be enlarged to include specific user information that may of interest to merchants. For example, a merchant may be interested to learn the ethnic group to which the user belongs or the family income that the user has. Not all data are necessarily entered by the user. For example, the IP address might be extracted from a data packet sent from the user's computer after the user clicks a "SUBMIT" button.

After the user data 200 are collected, they are validated. The validation may be performed by the promoter server 112. However, validation may also be performed by the web server 110 or a third party service provider's server. If the promoter server 112 is doing the validation, the promoter server 112 checks for typographical errors or invalid data. For example, if a user enters a joke name, such as "Guess Who," as his name, when the name is checked against a database of illegal names it will be flagged as invalid. Besides checking for invalid names, the promoter server 112 also checks for the validity of e-mail addresses. The promoter server 112 may check the format of an e-mail address and the validity of the domain name of the e-mail address. For example, if the user provides "james@xyz.net" as his e-mail address, the promoter server 112 will detect that the e-mail is invalid for not having "@" separator. After prompting the user to correct the e-mail entry, the server checks "xyz.net" against a database of domain names. The validity of an e-mail domain, such as xyz.net, can also be checked by "pinging" the destination domain. The promoter server 112 may also check the validity of an e-mail address by sending a test e-mail to the e-mail address. If the e-mail bounces back, the e-mail address will be marked as invalid. An e-mail bounces when it is undelivered and returned to the sender with an error message.

The correctness of the user's address may also be checked against an address database, such as the address database of the U.S. postal service. If the user provides a ZIP code of a city in Illinois and lists Georgia as his state, the promoter server 112 will flag it as invalid address. The promoter server 112 may also validate the telephone number provided against a subscriber database from a telephone service provider. The promoter server 112 may also cross-check the address with the address information associated with the telephone number. If the address associated with the home telephone number is in New Jersey and the home address provided is in New York, then the both the telephone number and the address are marked as invalid.

Certain missing address information may also be complemented or corrected. For example, if the user failed to provide his city and state, but provided the ZIP code, the promoter server could be able to complement the address information by retrieving the city and state name from an address database using the ZIP code. Similarly, if the user provided his street address with exception of the ZIP code, the promoter server may be able to find and fill in the ZIP code using the address database.

The date of birth is also checked. If the user enters the date in the format of dd/mm/yyyy instead of mm/dd/yyyy and enters 25/02/1960, the promoter server 112 will detect "25" as an invalid month and request the user to re-enter the data. The promoter server 112 may also compute the user's age and check it for validity. If the user enters 2000 as year of birth, the promoter server 112 will prompt the user to change it if it does not expect or accept a three year old child as a user. Similarly, if the user enters 1850 as the year of birth, the promoter server 112 will flag it as invalid year and request the user to re-enter the data.

In addition to validating the user data, the promoter server 112 also formats the user data to conform a pre-determined standard. For example, the user may enter "Georgia" as the state of residency, and the server will change it to "GA"; if the user has entered "new york" as the city, the server will change it to "New York." The formatted user data can then be easily used by other applications.

After validating the user data, the promoter server 112 compares the user data with criteria from a plurality of advertisers. Each advertiser may either set up its own criteria through a web page interface or provide its criteria to the ad promoter for entry into the ad promoter's system. The web page for setting up advertiser criteria may include a plurality of fields, where each field refers to a user characteristic. If the user data matches the criteria from one or more advertisers, ads from these advertisers will be included in an opt-in window and displayed to the user. FIG. 3 is an example of a criteria table 300. There are a plurality of entries in the criteria table 300, one per each advertiser or one per each ad. Each advertiser may list one or more ads in the criteria table 300. Each ad has a set of criteria that must be satisfied before the ad is included in the opt-in window. For example, an advertiser may target Ad_1 302 to users who have a valid e-mail address, live in state of Georgia in the U.S., and who are male. The same advertiser may have another ad designed for a different age range but but not limited to a specific state as shown in entry 306. In this entry, the ad is addressed to males, between 25 and 35 years old, in the U.S. and who have a valid e-mail address. Another ad 304 from a regional advertiser focuses only on females between 20 and 30 years of age who live in the region covered by ZIP code 30309. Finally, an advertiser that relies more on direct telephone marketing might be more interested in people living in the state of Georgia who have a telephone number with the area code of 404 as is reflected by Ad_3 308. The criteria table 300 does not necessarily show all data collected from users and may be expanded to cover other data.

Figure 4:
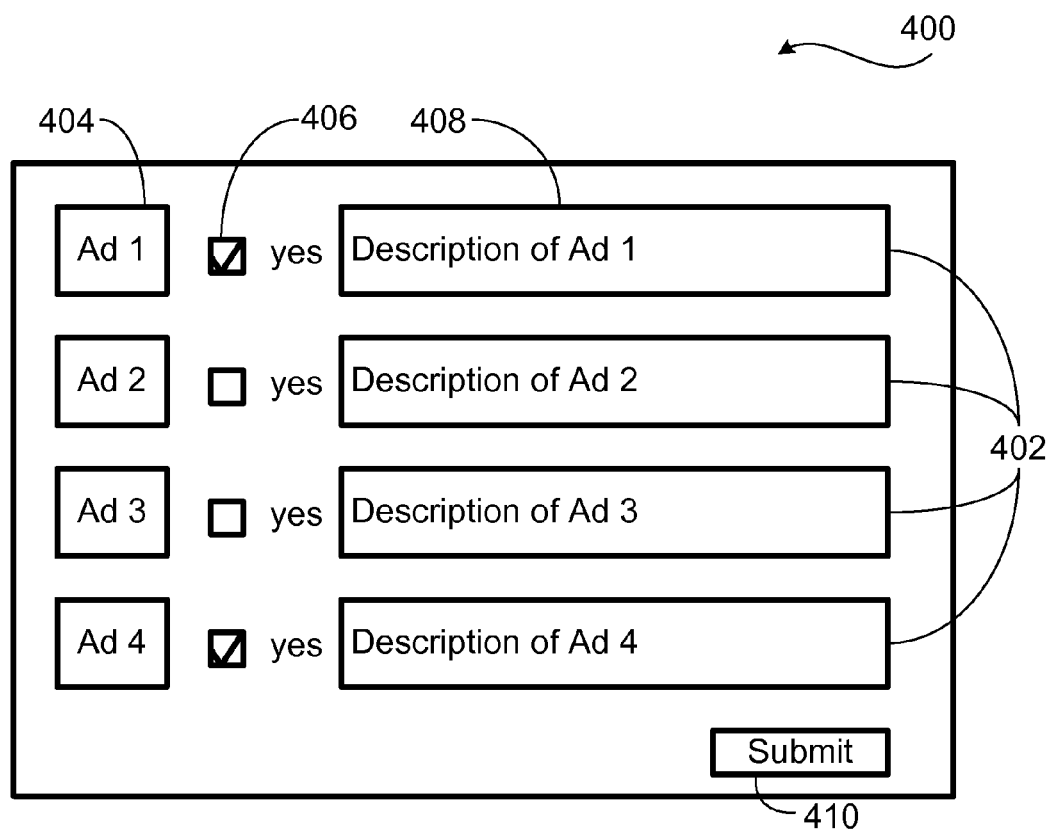
FIG. 4 is an opt-in window according to one embodiment of the invention.

FIG. 4 is depicts an opt-in window with a plurality of entries 402. Each entry 402 has an ad 404, an opt-in box 406, and an ad description 408. The ad 404 may be a picture of a product, a logo, or other advertiser identification mark. The ad description 408 provides a brief description of a product or a promotion. If the user wants to receive additional information about the product or promotion, he checks the opt-in box 406. The user may check one or more opt-in boxes. After checking the appropriate opt-in boxes, the user clicks the submit botton 410 to submit his choices.

Figure 5:
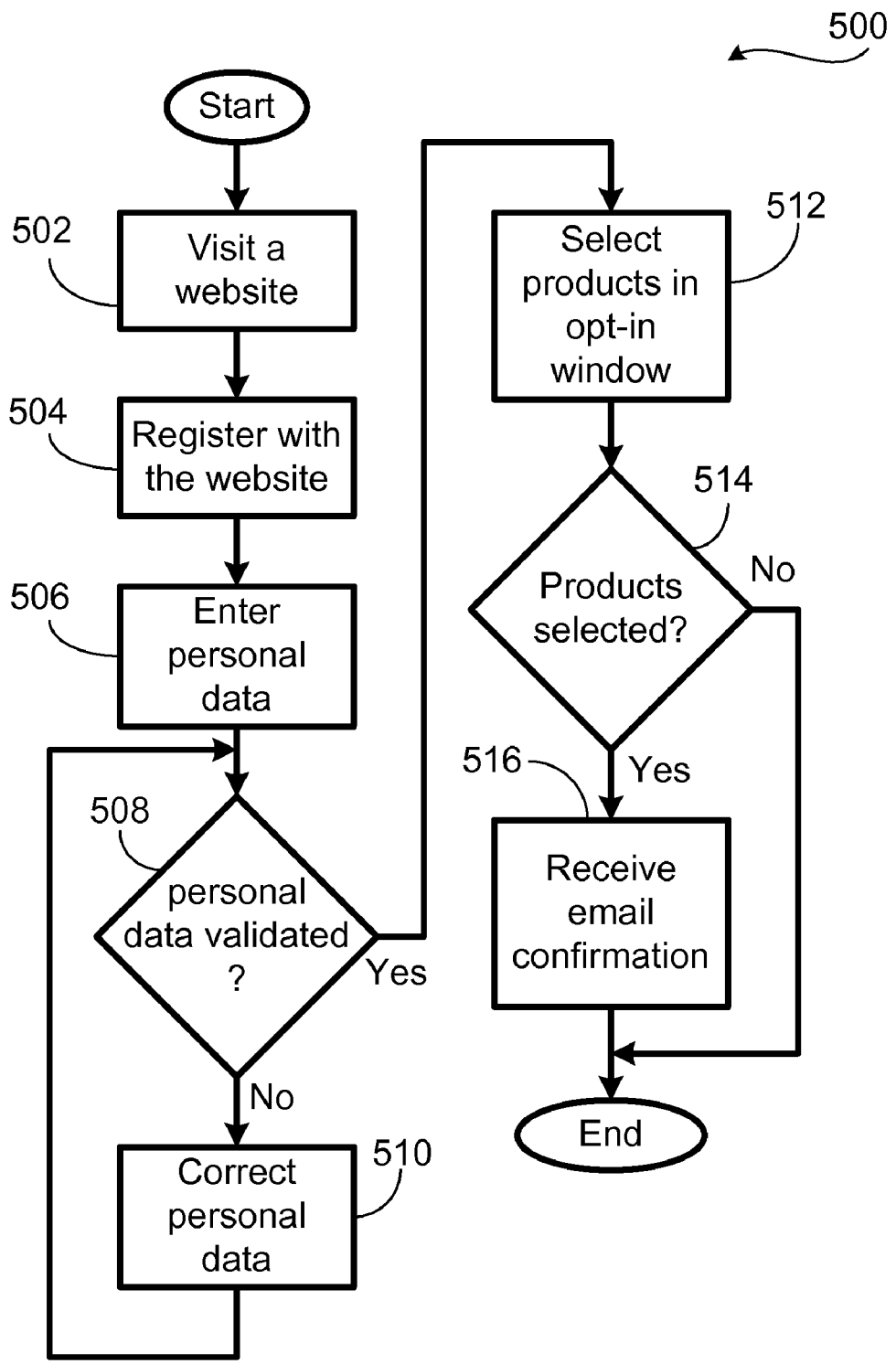
FIG. 5 is a flow chart for a user process.

FIG. 5 is a flow chart for a user process 500. The user visits a website hosted by a web sever, step 502, and browses the information on that website. The website may entice the user to register himself with the website through a free offer. If the user enjoys the website, or likes the free offer, he may register with the website, step 504. A screen with a list of input fields will be displayed to the user, where he can enter his personal data, step 506. The list of personal data depends on the nature of personal data that the website wants to capture. After receiving the data from the user, the web server sends the data to a promoter server for validation. The validation includes checking for spelling errors and comparing the data against different databases, step 508. If there is any error or invalid data, the web server prompts the user to enter the correct data, step 510.

After the data is validated, the promoter server formats the data to a standard format. Subsequently, the promoter server compares the user data against a set of criteria from a plurality of advertisers. For the criteria that the user data matches, the promoter server selects the products from these advertisers and assembles them in an opt-in window, step 512. The opt-in window, with a list of selected products, is then displayed to the user.

After viewing the opt-in window with a list of products, the user may be attracted to request further information on these products, and the user can request more information by checking the opt-in box listed beside the product. The opt-in window will go away after the user clicks the "Submit" button or closes the opt-in window manually. After the opt-in window is closed, the promoter server checks whether the user has opted to receive additional information on any product, step 514. For each product selected by the user, the promoter server will send a confirmation e-mail, step 516, to the user on behalf of the advertisers thanking the user for the request. In addition to sending a confirmation e-mail to the user, the promoter server will also send the user information and the user request to the advertiser.

Figure 6:
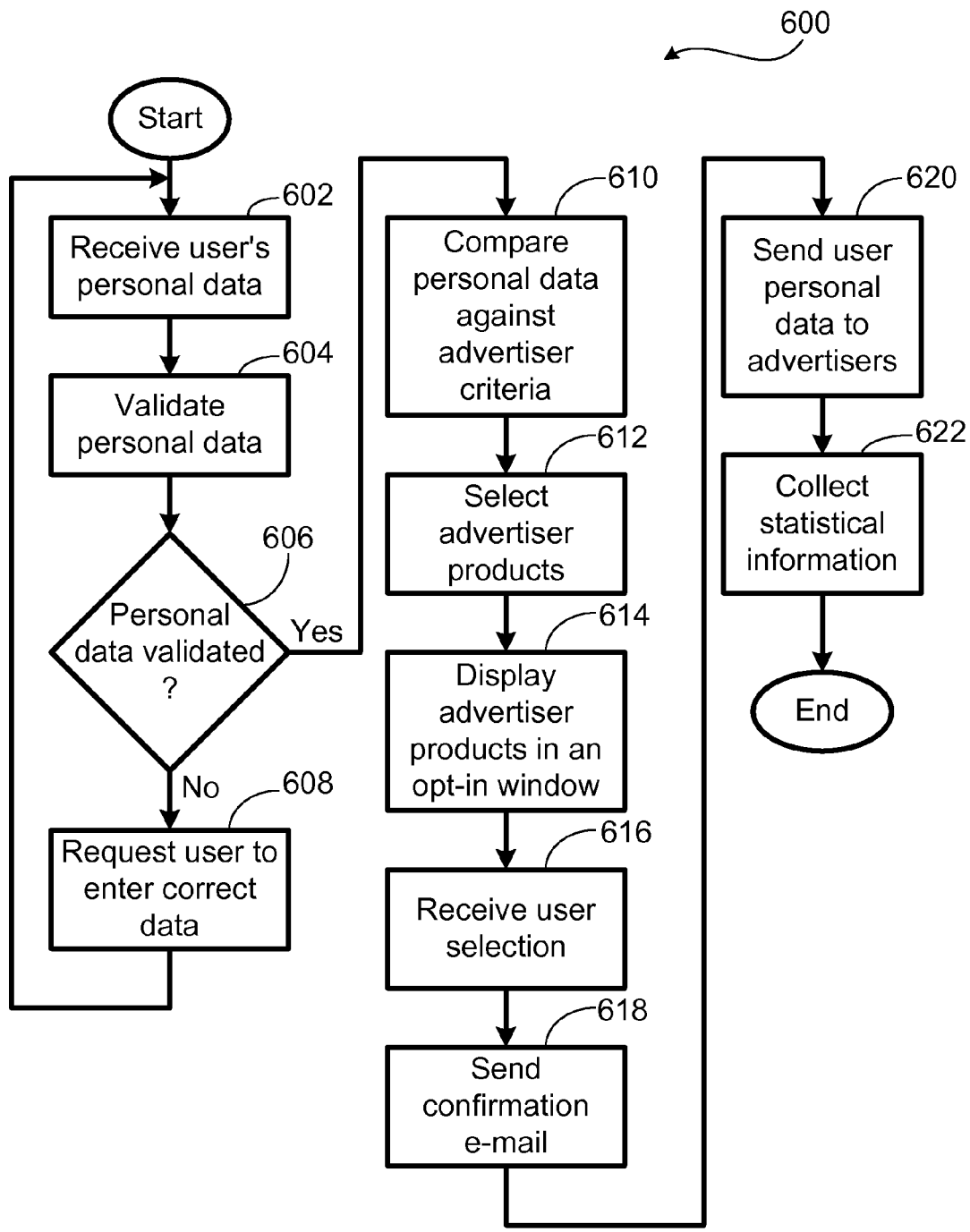
FIG. 6 is a flow chart for a server process.

FIG. 6 is a flow chart depicting a combined server process 600. The web server displays a website for a merchant, which presents many different offers of products and services. When the user decides to receive additional information from the merchant, the user provides his personal information to the web server. The web server receives the user's personal data, step 602, and forwards the data to a promoter server for validation, step 604. In one emboidment, the user could have provided his personal information to the web server on a prior occasion as part of a registering process with the web server, and only now the user's personal information is passed to the promoter server as part of a promotional campaign. The same user information may be passed to the promoter server for different promotional campaigns.

After receiving the user personal data, the promoter server validates it by comparing it to a plurality of databases. If the personal data is not valid, the web server prompts the user to re-enter his information, step 608. Otherwise, the promoter server compares the user's data to criteria from a plurality of advertisers, step 610. For the advertisers whose criteria fit the user's data, their products are selected, step 612, and displayed to the user in an opt-in window, step 614. After the user selects which products he would like to receive more information about, the promoter server receives the user's selection, step 616, and sends a confirmation e-mail, step 618, to the user on behalf of the advertisers. Additionally, the promoter server sends the user's data to the advertisers whose products the user has selected, step 620, and collects statistical information related to the user data, step 622. Although, the description above refers to a web server and a promoter server, the description is also applicable when the functions are hosted by one single server.

Besides sending the user data to the advertisers, the promoter server may also save them in a promotional record. The promotional record may store a list of users whose information have been sent to the advertisers and their personal information. FIG. 7 illustrates a plurality of promotional records 800 in a database. For each promotional record, the promoter server saves the advertiser's identification 810, the promotion's identification 814, and a record of recipients 814. The record of recipients includes the list of users to whom a promotion has been shown and the personal data for these users. Each advertiser may have multiple entries, one for each promotion. For example, if avertiser 1 has conducted two promotional compaigns, then there will be two entries, 802 and 804. These records are particularly useful when a repeat user does not provide his full personal information on his subsequent visits.

Figure 8:
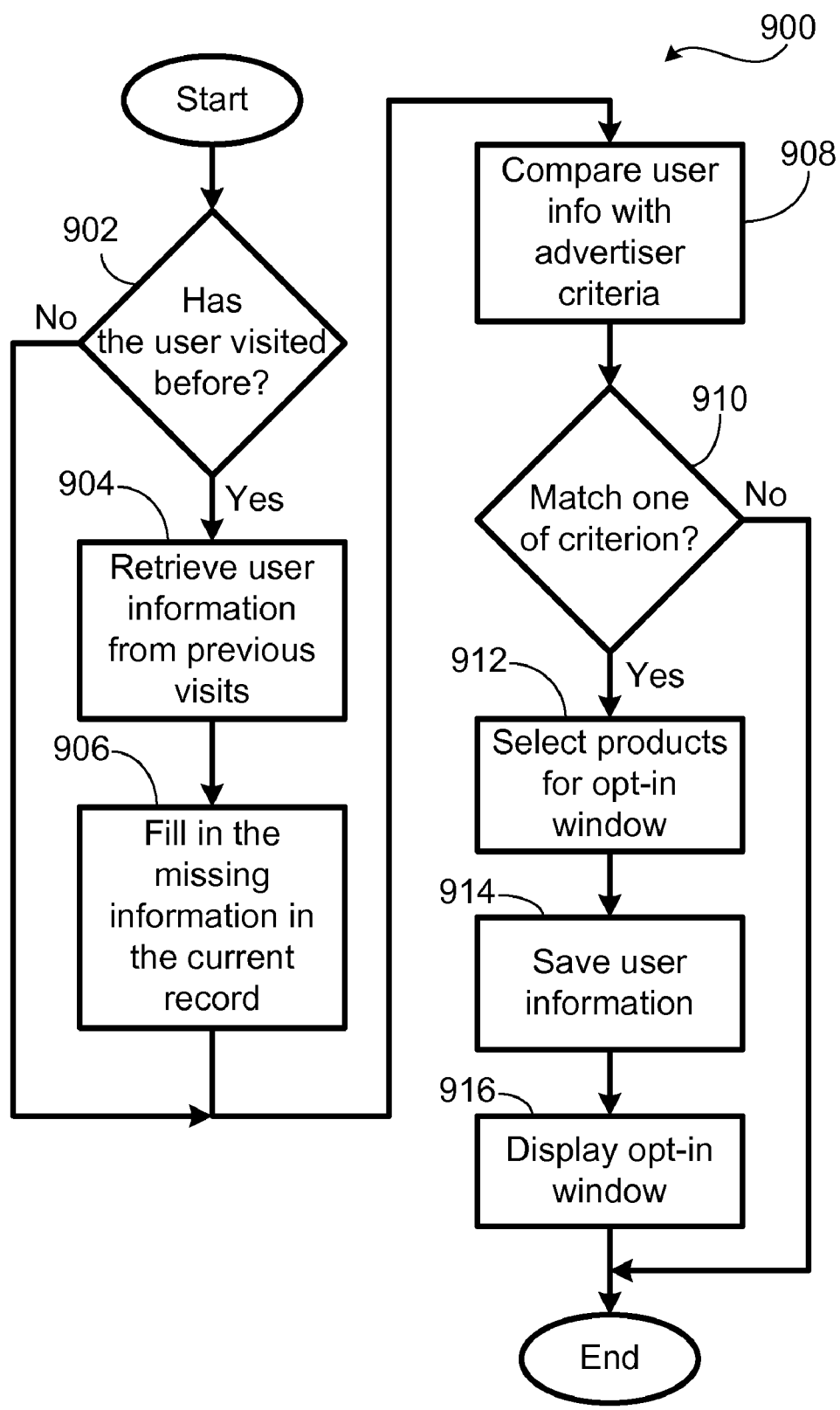
FIG. 8 is a flow chart for a server process with a data roll up feature.

FIG. 8 is a flow chart 900 for a data roll up feature. The data roll up feature allows the promoter server to supplement a user information provided by the web server with data from the user's previous visit. This feature is particularly useful when a repeat user fails to provide all his personal information. When the promoter server receives an incomplete user information from the web server, the promoter server checks whether the user is a repeat user, step 902. The promoter server may be able to check whether the user is a repeat user by using the information received from the web server. For example, if the user has provided his e-mail address, the promoter server may check whether such e-mail address is in one of the promotion records for in the database. The promoter server may also identify the user by his telephone number or his name. If the user is a repeat user, the promoter server retrieves the missing information from the record of his prior visit, step 904. If the user has visited more than once before, the promoter server may be able to compose the missing data from several records related to his prior visits. The information retrieved from the past visits is used to fill in the record of his current visit, step 906. For example, if the user failed to provide his sex and his age, the promoter server may be able to identify the user through his e-mail and retrieve his sex and age from records of his prior visits.

After filling in the missing information, the promoter server compares the user information with advertiser criteria, step 908. If the user information matches one criterion from one advertiser, step 910, the promoter server selects and includes products from that avertiser into an opt-in window, step 912. The promoter server may save either the user information as received from the web server or the updated user information, step 914. Finally, the promoter server displays the opt-in window to the user, step 916, and sends the user information to the advertiser. The promoter server sends the updated user information to the advertiser if the information retrieved from the previous records is needed for the advertiser to communicate with the user.

If the user information received from the web server is incomplete and the user is not a repeat user, the promoter server may process the user information normally by comparing the available information with advertiser criteria. If the missing user information is not one of criteria data from the advertiser, the promoter server may display an opt-in window to the user if the user information as provided satisfies the advertiser criteria.

Figure 9:
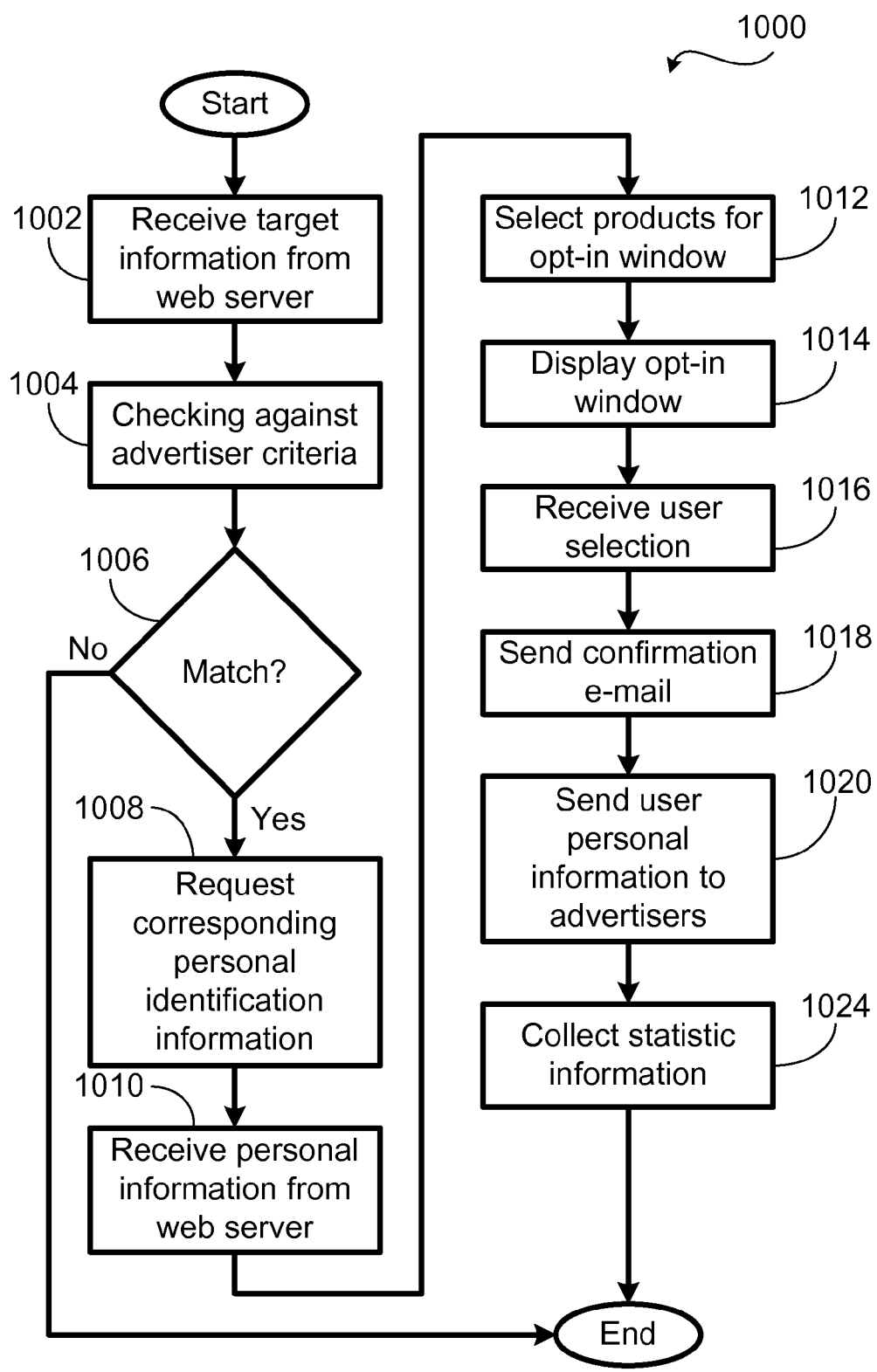
FIG. 9 is a flow chart for a server process with a privacy feature.

FIG. 9 is a flow chart 1000 of a promoter server process with a privacy feature. When privacy is of concern, a web server may not want to release a user's personal information when it is possible that the user may not meet an advertiser's criteria. In this situation, the web server passes only a target information that is necessary for the advertiser criteria comparison purpose. The target information is information used by advertisers to select their target groups and may include sex, age, ZIP code, area code, etc. The promoter server receives the target information from the web server, step 1002, and checks the target information against the advertiser criteria, step 1004. If the target information matches the advertiser criteria, step 1006, the promoter server then request user's personal information, step 1008. After receiving the personal information from the web server, step 1010, the promoter server selects products for the opt-in window, step 1012, and displays the opt-in window, step 1014. The steps 1016-1024 are similar to those described for steps 616-622 in FIG. 6.

If the target information does not match the advertiser criteria, then there is no need to receive the rest of user information. In an alternative embodiment, the promoter server may request user's personal information if the user has opted in to receive additional information from the advertiser. If the user has seen the opt-in window but has not opted to receive additional information from the advertiser, then there is no need to request additional user information from the web server.

In an alternative embodiment, certain missing information may be replaced with statistical census data. For example, if the information received from the web server does not include family income and the family income is part of advertiser criteria, the promoter server may use user's ZIP code to retrieve the average income of people living in the area where the user resides and assigns this average income to user for the purpose of checking whether the user qualifies for the advertiser criteria. For example, if the user did not input his family income and the average income in the neighborhood where he lives is $100,000.00 according to the data from the Census Bureau, the promoter may use $100,000.00 as his income when comparing his information against the advertiser criteria. Similar assignment of statistical data can be done for age, sex, number of children, marital status, ethinic background, etc. The promoter server may provide these statistical data to the advertiser indicating that these are assigned data instead of actual data.

The promoter server bills each advertiser according to a flexible pricing algorithm. The following is one example of a flexible pricing algorithm. The variables and constants can be added, deleted, or changed according to business needs.

$$X=(Yn \text{ based on existing, valid criteria required and passed})-((Z-A)\times(Y\times100))-((C-B)\times((Y\times100)\times1.25))-((D-E)\times((Y\times100)\times1.25))-((F-G)\times((Y\times100)\times1.25))+(H+I+J)$$

Where:
X is the final bounty assigned to an offer charged to an advertiser, on a specific page, to a specific consumer coming through, with the specific valid information being passed; X may not be greater than Y;
Y is the maximum bounty set by the advertiser for a specific set of criteria. E.g., demographic, geographic and data-graphic (fields of data passed). There may be more than one Y set for each offer (e.g. Y1, Y2, Yn). For instance Y1=$0.50 for first name, last name, e-mail, ZIP code, female. Y2=$0.30 e-mail, female. Y3=$0.20 e-mail. Etc.;
Z is the average unique opt-in rate on the page for the past 5 days. Unique opt-in rate is the number of people that opt-in to at least 1 offer. (e.g 0.22 or 22%);
A is the average unique opt-in rate on the entire network for the past 5 days. Unique opt-in rate is the number of people that opt-in to at least 1 offer. (e.g 0.20 or 20%);
C is the average opt-in rate of similar offers on the page for the past 5 days;
B is the average opt-in rate of similar offers on the entire network for the past 5 days;
E is the average confirmation e-mail open rate of all offers on the page over the last 5 days;
D is the average confirmation e-mail open rate of all offers on the network over the last 5 days;
F is the average confirmation e-mail open rate of all offers on the network over the last 15 days where the data passed in, data left after validation and data collected are the same. (e.g. First, Last & E-mail were passed, E-mail was good but First and Last Names were not good and E-mail was collected.);
G is the average confirmation e-mail open rate of all offers on the page over the last 15 days where the data passed in, data left after validation and data collected are the same;
H is a 0 or negative based on the placement of page (Static);
I is a 0 or negative based on the layout of offers (Static);
J is a 0 or negative based on the type of website (Static).

A flexible pricing algorithm, such as above, allows an advertiser to specify the price he is willing to pay for each piece of information and the actual price paid depends on the type of information provided by a website. For example, the advertiser may be willing to pay a maximum bounty (Y) of 10 cents for a valid e-mail address, 20 cents for a valid e-mail address plus a corresponding physical address, or 30 cents for a valid e-mail address plus a physical address and a telephone number. The actual, final bounty (X) paid by the advertiser will not be greater than the maximum bounty (Y). The actual final bounty (X) is calculated by adjusting the maximum bounty (Y) according to various performance factors unique to the website where the user data is collected. The advertiser may pay more for data collected from a high traffic website or a website that consistently visitors who provide verifiable data. Conversely, the advertiser may pay less for data collected from a "low traffic" website.

The factors that affect the pricing algorithm are adjusted dynamically based on a website's performance. For example, an increase in the opt-in rate, which will be explained in more detail later on, in last 5 days would improve the website's performance, and may result in an increase in the bounty paid by an advertiser. An increase in confirmation e-mail open rate would also improve the website's performance and affect positively on the bounty paid by the advertiser.

The flexible pricing algorithm allows dynamic calculation of a bounty for each ad shown to each user. The algorithm is adjusted according to historical data that may be adjusted frequently. The historical data include, but are not limited to, the opt-in rate on the network, the opt-in rate of similar offers, the confirmation e-mail open rate on the network, the confirmation e-mail opent rate of similar offers, etc. The opt-in rate is a rate of users "clicking" or "checking" at least one offer in an opt-in window. The confirmation e-mail open rate is a rate of users opening the confirmation e-mails. A network rate refers to the rate calculated based on all the websites controlled by a prmoter.

The pricing algorithm is flexible because it depends and reflects on the quality of data collected. The quality of data depends on many factors and can be enhanced by certain approaches. For example, if a confirmation e-mail that was sent to an opt-in user bounced, the e-mail address would not be collected. Similarly, if a user immediately unsubscribes to any future e-mails upon receiving the confirmation e-mail, this user's e-mail would not be collected either. On the other hand, if a confirmation e-mail is opened by the user, then the user's e-mail would have a high value because it belongs to an active user. The opening of a confirmation e-mail can be detected either by a return receipt attached to the e-mail or a notice from a website when the e-mail is in a hyper-text markup language (HTML) format.

The quality of the data collected also depends on the quality of information on the website visited by users. A web server that consistently provides visitors with useful information or attractive offers is likely to collect good data from its visitors and should be rewarded accordingly. One way to reward a web server adequately is to pay it based the data collected or the percentage of opt-in generated. Thus, a web sever will be paid more if it manages to get more opt-ins from its visitors.

The following describes an examplary scenario of the invention. An ad promoter solicits ad business from several advertisers by allowing advertisers to target their ads to a specific demographical group. For example, an advertiser may be interested only in women between 35 and 45 years of age, married with children. The advertiser will pay $0.50 for each telephone number for users meeting this criteria. The ad promoter then contracts with several web servers who host websites most likely to be visited by this specific group of users.

When a user with these qualifications visits a website for a woman's magazine, for example, she will see an invitation to join the magazine's e-mail list for receiving free coupons. She registers with the magazine's website and provides her personal data, such as age, e-mail address, telephone number, home address, marital status, number of children, etc. The web server for the woman's magazine forwards a copy of this data to a promoter server for validation.

The promoter server checks the user's personal information. For example, the telephone number may be checked through a reverse white page service provided by a third party. If the telephone number is valid, the reverse white page service returns the telephone number with an address, which will be checked against the home address. If they match, the promoter knows that the telephone number and the home address are good.

After checking the personal information, the promoter server compares the information with criteria from the advertiser. If a user is a woman who is 40 years old, married with 2 children, then she matches the advertiser's criteria. The promoter server will then assemble an opt-in window with the advertiser's special promotion and display the opt-in window to the user.

If the user is interested in the special promotion and wants to learn more about the product, she checks the opt-in box and submits her request. The promoter server sees that the user has opted in to receive additional information and then sends a confirmation e-mail to the user on behalf of the advertiser thanking her for the request. The promoter server will also collect the user's telephone number and send it to the advertiser.

The promoter calculates a fee that will be charged to the advertiser for the service of displaying the promotion and providing a good telephone number. The promoter also pays the web server for the woman's personal information.

While the invention has been particularly shown and described with reference to a preferred embodiment thereof, it will be understood by those skilled in the art that various changes in form and detail maybe made without departing from the spirit and scope of the present invention as set for the in the following claims.

What is claimed is:

1. A system for presenting a customized opt-in window to a user, the system having a computer server connected to a global computer network, the server comprising:
   a. a network interface in communication with the global computer network;
   b. a controller that is configured to receive a web site address from the user and to present to the user a web page corresponding to the web site address, wherein the web page includes information of interest to the user and an invitation for the user to register with the web site, the controller also configured to present to the user a registration page that includes a plurality of data fields into which the user is requested to enter personal information about the user;
   c. a user data validation unit configured for validating information received from the user including information indicating that the user has opted into at least one on-line promotion;
   d. an on-line promotion selection unit that is configured to compare the personal information entered by the user with a plurality of advertiser criteria sets each associated with a different on-line promotion and to select at least one on-line promotion having a criteria set of the plurality of criteria sets that is met by the personal information entered by the user, the on-line promotion selection unit also configured to present an opt-in window to the user by which the user indicates to the on-line promotion selection unit that the user desires to receive the at least one on-line promotion;
   e. an electronic mail handler configured to transmit electronically, upon the user indicating that the user desires to receive the at least one on-line promotion, the personal information to an advertiser sponsoring the selected on-line promotion and to send a confirmation e-mail to the user on behalf of the advertiser sponsoring the selected on-line promotion; and
   f. a pricing calculator configured to calculate a final bounty to be paid by the advertiser according to the following formula:

$$X=(Y)-((Z-A)\times(Y\times100))-((C-B)\times((Y\times100)\times1.25))-((D-E)\times((Y\times100)\times1.25))-((F-G)\times((Y\times100)\times1.25)),$$

wherein:
X is the final bounty assigned to an offer charged to an advertiser, on the web page, to a specific consumer coming through, with specific valid information being passed, in which X may not be greater than Y,
Y is a maximum bounty set by the advertiser for a specific set of criteria, including selected ones of: demographic criteria and geographic criteria,
Z is an average page unique opt-in rate on the web page for a first predetermined number of days, wherein the page unique opt-in rate is a number of people that opt-in to at least one offer;
A is an average network unique opt-in rate on an entire network for the first predetermined number of days, wherein the network unique opt-in rate is a number of people that opt-in to at least one offer;
C is an average opt-in rate of similar offers on the web page for the first predetermined number of days;
B is an average opt-in rate of similar offers on the entire network for the first predetermined number of days;
E is an average confirmation e-mail open rate of all offers on the page over the first predetermined number of days;
D is an average confirmation e-mail open rate of all offers on the entire network over the first predetermined number of days;
F is an average confirmation e-mail open rate of all offers on the entire network over a second predetermined number of days where data passed in, data left after validation and data collected are the same; and
G is an average confirmation e-mail open rate of all offers on the page over the second predetermined number of days where data passed in, data left after validation and data collected are the same.

2. The system of claim 1, further comprising a data storage unit that is configured to store a plurality of promotional records, each promotional record corresponding to a promotional campaign.

3. A computer-readable medium on which is stored a computer program for presenting a customized opt-in window, the computer program comprising instructions which, when executed by a computer, perform the steps of:

a. receiving target information from an advertiser, the target information setting forth a set of criteria used to select a user from a plurality of users to receive a selected on-line promotion;
b. displaying a web page to the plurality of users, the web page having a plurality of fields for collecting user information;
c. receiving the user information from each of the plurality of the users;
d. comparing the user information from each of the plurality of the users to the set of criteria; and
e. for each of the plurality of users whose user information matches the set of criteria, displaying an on-line promotion from the advertiser in an opt-in window;
f. determining an average page unique opt-in rate on the web page for a first predetermined number of days, wherein the page unique opt-in rate is a number of people that opt-in to at least one offer;
g. determining an average network unique opt-in rate on an entire network for the first predetermined number of days, wherein the network unique opt-in rate is a number of people that opt-in to at least one offer;
h. determining an average opt-in rate of similar offers on the web page for the first predetermined number of days;
i. determining an average opt-in rate of similar offers on the entire network for the first predetermined number of days;
j. determining an average confirmation e-mail open rate of all offers on the page over the first predetermined number of days;
k. determining an average confirmation e-mail open rate of all offers on the entire network over the first predetermined number of days;
l. determining an average confirmation e-mail open rate of all offers on the entire network over a second predetermined number of days where data passed in, data left after validation and data collected are the same; and
m. determining an average confirmation e-mail open rate of all offers on the page over the second predetermined number of days where data passed in, data left after validation and data collected are the same; and
n. calculating a final bounty to be paid by the advertiser according to the following formula:

$$X=(Y)-((Z-A)\times(Y\times100))-((C-B)\times((Y\times100)\times1.25))-((D-E)\times((Y\times100)\times1.25))-((F-G)\times((Y\times100)\times1.25)),$$

wherein:
X is the final bounty assigned to an offer charged to an advertiser, on the web page, to a specific consumer coming through, with specific valid information being passed, in which X may not be greater than Y,
Y is a maximum bounty set by the advertiser for a specific set of criteria, including selected ones of: demographic criteria and geographic criteria,
Z is the average page unique opt-in rate on the web page for a first predetermined number of days, wherein the page unique opt-in rate is a number of people that opt-in to at least one offer;
A is the average network unique opt-in rate on the entire network for the first predetermined number of days, wherein the network unique opt-in rate is a number of people that opt-in to at least one offer;
C is the average opt-in rate of similar offers on the web page for the first predetermined number of days;
B is the average opt-in rate of similar offers on the entire network for the first predetermined number of days;
E is the average confirmation e-mail open rate of all offers on the page over the first predetermined number of days;
D is the average confirmation e-mail open rate of all offers on the entire network over the first predetermined number of days;
F is the average confirmation e-mail open rate of all offers on the entire network over a second predetermined number of days where data passed in, data left after validation and data collected are the same; and
G is the average confirmation e-mail open rate of all offers on the page over the second predetermined number of days where data passed in, data left after validation and data collected are the same.

4. The computer-readable medium of claim 3, further performing the step of validating the user information from each of the plurality of the users.

5. The computer-readable medium of claim 4, wherein the validating step includes the steps of:
a. checking a user address against a postal service database; and
b. checking a user telephone number against a telephone service provider database.

6. The computer-readable medium of claim 4, wherein the validating step includes the step of comparing the user's age against a predefined age range.

7. The computer-readable medium of claim 4, wherein the validating step includes the step of checking the user's e-mail address.

8. The computer-readable medium of claim 3, further performing the step of formatting the user information from each of the plurality of the users according to a predefined standard.

9. The computer-readable medium of claim 3, further performing the steps of:
a. receiving at least one selection from a user who has opted to receive at least one selection from the opt-in window displayed to the user; and
b. sending a confirmation e-mail to the user who has opted to receive at least one selection.

10. The computer computer-readable medium of claim 3, further performing the steps of:
a. using a portion of the user information to retrieve additional user data from a record; and
b. assembling the retrieved user data into the user information.

11. The computer-readable medium of claim 3, further performing the steps of:
a. using part of the user information to retrieve census data from a database; and
b. assembling the census data into the user information.

* * * * *